(No Model.) 2 Sheets—Sheet 1.

H. C. SEARS.
TWO WHEELED VEHICLE.

No. 335,248. Patented Feb. 2, 1886.

WITNESSES.
J. M. Dolan.
Fred. B. Dolan.

INVENTOR.
Henry C. Sears
by his attys
Aaker & Raymond

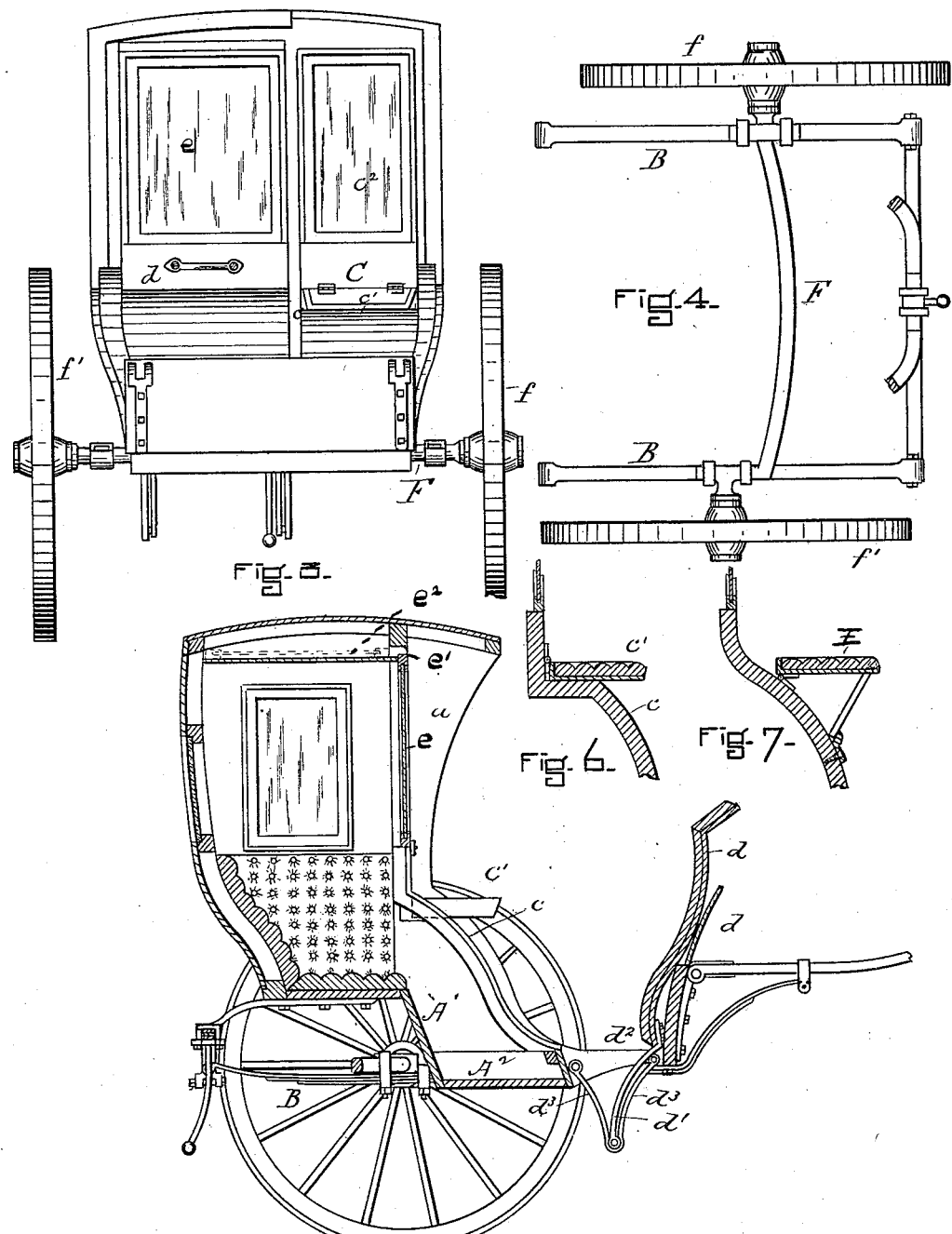

UNITED STATES PATENT OFFICE.

HENRY C. SEARS, OF BOSTON, MASSACHUSETTS.

TWO-WHEELED VEHICLE.

SPECIFICATION forming part of Letters Patent No. 335,248, dated February 2, 1886.

Application filed January 29, 1885. Serial No. 154,306. (No model.)

*To all whom it may concern:*

Be it known that I, HENRY C. SEARS, of Boston, in the county of Suffolk and State of Massachusetts, a citizen of the United States, have invented a new and useful Improvement in Vehicles, of which the following is a full, clear, and exact description, reference being had to the accompanying drawings, forming a part of this specification, in explaining its nature.

The invention is represented as applied to that class of vehicles known as "Hansom cabs;" but I do not wish it to be understood that it is limited in its application to such cabs, as certain features of it may be used in carriages of other descriptions.

The principal features of the invention consist, first, in locating the driver's seat in front of the principal or inclosed seat of the vehicle, instead of above and behind it, as in the Hansom cab; second, in making the door section movable in such a manner as to permit easy entrance to the vehicle; and, third, in the arrangement and shape of the axle, whereby it is made stronger upon one end than at the other and one wheel is in a line somewhat in advance of the center of the hub of the other, which secures for the vehicle certain advantages, especially in cities where horse-railroad tracks are common, as I have ascertained by so arranging the line of the wheels that not only is the base of the vehicle somewhat increased, whereby its action is easier, but it will cross and leave railroad-tracks easily, as one wheel slightly leads the other.

Figure 1:
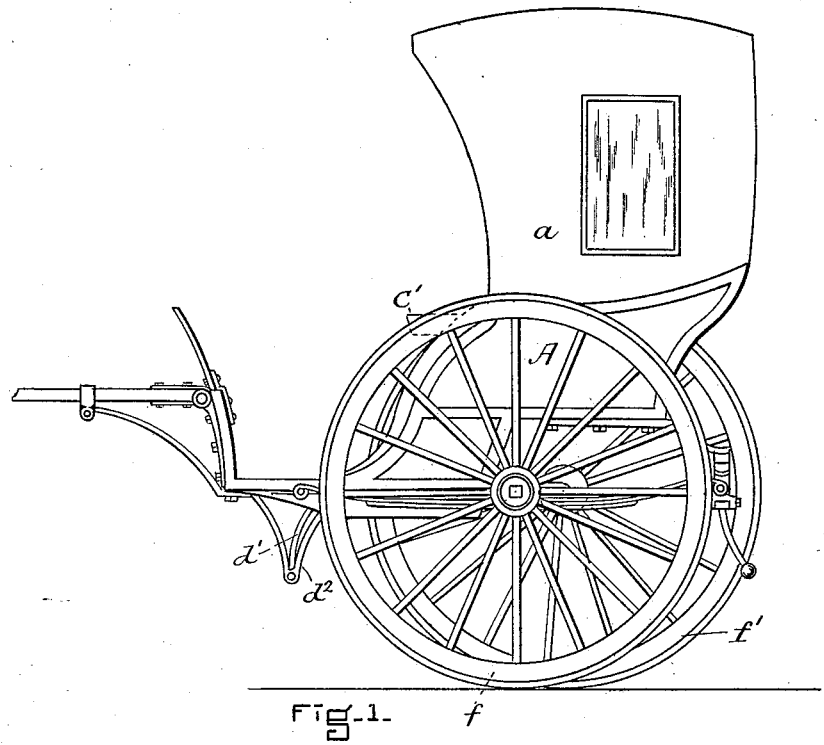
Figure 2:
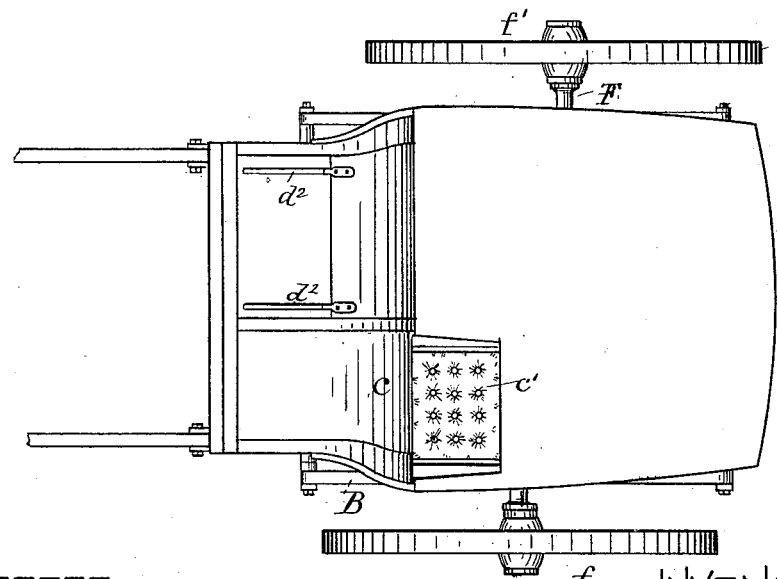

In the drawings, Figure 1 is a view in elevation of a cab having the features of my invention. Fig. 2 is a plan view thereof. Fig. 3 is a front elevation, a part of the dasher being broken out to show the front of the vehicle. Fig. 4 is a view in plan of the axle, wheel, and part of the running-gear. Fig. 5 is a vertical central section, and Figs. 6 and 7 are detail views showing the location the first of the driver's seat and the second of an extra or additional outside seat.

The body A of the vehicle is made in any desired form, as is also the top and upper section, $a$, thereof.

The principal seat, A', of the vehicle extends from side to side, and the flooring $A^2$ is lower than the flooring or rest which constitutes the driver's foot-board, so that a step down from the driver's foot-rest is taken in entering the vehicle. This brings the seat A' well down and the flooring substantially upon or a little below the line of the axle, and by this construction I am enabled to locate or place the driver's seat so that it shall bear the peculiar position in relation to the seat A' hereinafter specified.

Any suitable running-gear may be used for supporting the body, and I have represented in the drawings the ordinary Hansom gear, consisting of the side springs, B, attached to the axle, and at the forward end to the sills of the body, and at the rear to a plate or hinged support depending from a bracket attached to the body.

The front wall of the vehicle is divided into the sections C D, one of which sections, C, is preferably fixed or fastened rigidly in place. It comprises the lower portion, $c$, which is curved, as represented, and supports the driver's seat $c'$, and the upper section, $c^2$, which has preferably a window or pane of glass.

The roof of the vehicle is not extended over the driver's seat, for the seat is situated so high that the driver's head generally comes above the upper surface of it. The portion occupied by this stationary part of the front I prefer to make about one-third of the entire width of the front, and to arrange it upon the left-hand side of the vehicle. The remaining section D of the front forms the entrance to the interior of the cab, and the interior is in every respect like that of the ordinary Hansom cab. This entrance is covered by the removable part or short door $d$, which is hinged at the bottom in a manner to provide for its entire movement forward to a position against the dasher, so as to provide an unobstructed entrance to the cab. The portion of the door when thus open is shown in Fig. 5. This peculiar movement of the door is accomplished by attaching to the under side thereof, near the bottom, the downward projecting rods or arms $d'$, which pass through slots $d^2$ in the flooring of the vehicle, and are pivoted to the brackets $d^3$, depending from the sills or lower frame-work of the cab. The slots in the flooring of course permit these arms or rods to freely travel or move. This movable section or door may also be provided with a seat, E, which preferably is hinged or attached thereto, so that it may be closed downward or be made entirely removable therefrom.

The upper section may be made up of two sashes connected by a hinge, so as to fold against the under surface of the roof or hood of the cab, or it may comprise one sash, e, preferably containing a pane of glass and arranged to turn outward on the center $e'$, and to be slid into the horizontal pocket $e^2$ on the top or roof of the cab, as shown in Fig. 5, and the sash is generally held in this position, as it is not necessary to use it except in stormy weather.

The axle F has an axle-spindle at one end, which is for the wheel $f$, and a forward extension, $f'$, (see Fig. 4) from which project the axle-spindle for the wheel $f$. It will be seen that by this arrangement or form of axle the center of one wheel is in advance of the center of the other wheel, and I have found that it is desirable to place the center of the front wheel about six inches in front of the center of the other.

The forward wheel should be on the side usually occupied by the driver or carrying the driver's seat, as by so locating it the vehicle is well balanced when the driver is seated and there are no passengers or occupants. In other words this construction or location of the wheels prevents the weight of the driver from tipping the vehicle to one side when the vehicle is otherwise unoccupied, and thereby provides for a steadiness and balance which are very desirable not only for appearance but for easy running, wear, and comfort of the driver and passengers.

It will be observed that a vehicle thus constructed can be strongly made, easily managed, readily entered, that the driver is so situated that he is of some advantage to the occupant, that it is compact, that there may be one outer seat in addition to the driver's, and that the entire arrangement combines economy in construction with efficiency—a practical adaptation of the English Hansom cab to American wants.

Of course the section C of the front may be at the right side of the vehicle, or centrally located in wide vehicles, if desired; and where centrally located there may be one entrance only upon one side of the seat of the vehicle, or one on each side, as may be desired. It will also be seen that the lower sections of the front are so shaped that their upper portions extend back to such an extent that when the principal seat of the vehicle is occupied the knees and legs of the occupants will be substantially under such sections, and that this shaping of the section necessarily causes the driver's seat to be arranged higher than it is in an ordinary vehicle; also, that when the driver's seat is arranged on one side of the vehicle the axle should be made stronger on that side, as it must support a greater weight.

Any suitable running-gear may be used in lieu of that herein described.

The driver's seat may not be attached directly to the fixed portion of the front, but may be arranged on any suitable support in front thereof. It will also be seen that by arranging the axle to support the driver, as above described, the cab is so balanced that the weight or drag upon the horse is not increased when the cab is occupied by the driver only, as his weight is at all times more nearly over the axle than if the wheel and axle were not carried forward.

Having thus fully described my invention, I claim and desire to secure by Letters Patent of the United States—

1. A cab or two-wheel vehicle having the body A, the seat A', the section C, forming a portion of the front wall of the vehicle and shaped substantially as specified, and the driver's seat $c'$, supported by the section or wall C in relation to the seat A', as shown, all substantially as and for the purposes described.

2. In a cab or other similar vehicle, the combination of the body A, having the seat A', the section C, forming a portion of the front wall of the vehicle, and shaped as described, the driver's seat $c'$, supported by the said section C and bearing the relation to the seat A' indicated, and the movable section or door $d$, all substantially as described.

3. The combination, in a cab or other similar vehicle, of the body A and the movable section or door $d$, hinged at its lower end, as described, to be movable bodily away from the front wall of the vehicle, all substantially as specified.

4. The combination of the section $d$ and rods or arms $d'$, hinged or pivoted to brackets $d^3$, and the slots $d^2$ in the flooring, all substantially as and for the purposes described.

5. The combination of the movable section $d$ of a Hansom cab or other similar vehicle with the seat E, all substantially as and for the purposes described.

6. A cab or other similar two-wheel vehicle having the driver's seat $c'$, and arranged as described, and the hood or roof of the cab cut away from immediately over the seat, all substantially as and for the purposes described.

7. In a two-wheel vehicle, the combination of the body A, having the driver's seat disposed upon one side thereof, substantially as described, the running-gear, the axle F, made in one piece and arranged to carry the wheel upon the side of the driver's seat in advance of the other wheel, whereby the balance of the vehicle-body, when occupied by the driver, or driver and two passengers, is made even or maintained, all substantially as and for the purposes described.

8. In a cab or other similar vehicle having the body A, the seat A', the flooring A², arranged below the flooring in front of the door of the vehicle, the sections C D, and the driver's seat C', all substantially as and for the purposes described.

HENRY C. SEARS.

Witnesses:
F. F. RAYMOND, 2d,
FRED. B. DOLAN.